(12) United States Patent
Zhou et al.

(10) Patent No.: US 11,953,791 B2
(45) Date of Patent: Apr. 9, 2024

(54) DISPLAY PANEL AND METHOD FOR MANUFACTURING THE SAME

(71) Applicants: Chengdu BOE Optoelectronics Technology Co., Ltd., Sichuan (CN); BOE TECHNOLOGY GROUP CO., LTD., Beijing (CN)

(72) Inventors: Peng Zhou, Beijing (CN); Xiaojing Qi, Beijing (CN); Bo Wu, Beijing (CN); Xiangdong Qin, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/128,008

(22) Filed: Mar. 29, 2023

(65) Prior Publication Data
US 2023/0236462 A1      Jul. 27, 2023

Related U.S. Application Data

(63) Continuation of application No. 17/516,802, filed on Nov. 2, 2021, now Pat. No. 11,656,512.

(30) Foreign Application Priority Data

Feb. 23, 2021   (CN) .......................... 202110202704.7

(51) Int. Cl.
*G02F 1/1362* (2006.01)
*G02F 1/1368* (2006.01)

(52) U.S. Cl.
CPC .. *G02F 1/136209* (2013.01); *G02F 1/136286* (2013.01); *G02F 1/1368* (2013.01)

(58) Field of Classification Search
CPC ..................................................... G02F 1/1362
See application file for complete search history.

(56) References Cited

U.S. PATENT DOCUMENTS

| | | | |
|---|---|---|---|
| 5,708,485 A | * | 1/1998 | Sato .................. G02F 1/136209 349/110 |
| 6,624,870 B1 | | 9/2003 | Greene et al. |

(Continued)

FOREIGN PATENT DOCUMENTS

| | | |
|---|---|---|
| CN | 101315507 A | 12/2008 |
| CN | 105759492 A | 7/2016 |

(Continued)

OTHER PUBLICATIONS

China Patent Office, CN202110202704.7 First Office Action dated Mar. 11, 2023.

(Continued)

*Primary Examiner* — Sang V Nguyen
(74) *Attorney, Agent, or Firm* — HOUTTEMAN LAW LLC

(57) ABSTRACT

There are provided a display panel and a manufacturing method thereof. The display panel includes first and second display sub-panels with a gap region arranged therebetween; and a light-shielding layer at least located in the gap region, the first and second display sub-panels each include multiple pixel units arranged in an array, each pixel unit includes: a substrate; a data line on the substrate; a black matrix on a side of the data line away from the substrate, an orthographic projection of the data line on the substrate falls within that of the black matrix on the substrate, in at least one of the first and second display sub-panel, the black matrix of the pixel unit closest to the gap region and the light-shielding layer are (Continued)

arranged with an interval therebetween, the black matrix is located on a side of the light-shielding layer away from the gap region.

18 Claims, 3 Drawing Sheets

(56) References Cited

U.S. PATENT DOCUMENTS

| | | | | |
|---|---|---|---|---|
| 6,788,372 | B1* | 9/2004 | Kaise | G02F 1/13394 |
| | | | | 349/122 |
| 2002/0140629 | A1* | 10/2002 | Sundahl | G02F 1/13336 |
| | | | | 345/1.3 |
| 2008/0297678 | A1* | 12/2008 | Lee | G02F 1/136209 |
| | | | | 438/30 |
| 2013/0342771 | A1* | 12/2013 | Kim | G02B 5/3083 |
| | | | | 349/15 |
| 2020/0150916 | A1* | 5/2020 | Jiang | G09G 5/006 |
| 2020/0295120 | A1 | 9/2020 | Bower et al. | |
| 2022/0229328 | A1* | 7/2022 | Yokoyama | G02F 1/1336 |

FOREIGN PATENT DOCUMENTS

| | | |
|---|---|---|
| CN | 108597382 A | 9/2018 |
| CN | 110174795 A | 8/2019 |
| CN | 111458924 A | 7/2020 |
| JP | 2000512037 A | 9/2000 |
| JP | 2001272667 A | 10/2001 |

OTHER PUBLICATIONS

USPTO, U.S. Appl. No. 17/516,802 First Office Action dated Sep. 23, 2022.

USPTO, U.S. Appl. No. 17/516,802 Notice of Allowance dated Jan. 13, 2023.

* cited by examiner

DISPLAY PANEL AND METHOD FOR MANUFACTURING THE SAME

CROSS REFERENCE TO RELATED APPLICATIONS

The present disclosure claims priority to Chinese patent application No. 202110202704.7 filed at Chinese Intellectual Property Office on Feb. 23, 2021, the disclosure of which is incorporated herein by reference in its entirety.

TECHNICAL FIELD

The present disclosure relates to the field of display technology, and particularly relates to a display panel and a method for manufacturing a display panel.

BACKGROUND

With the continuous development of display technologies, the variety and application scenarios of display panels are becoming more and more abundant. A display panel in the related art is a spiced display panel, and specifically, the display panel is formed by at least two display sub-panels spiced together.

However, since each of adjacent display sub-panels is provided with a data line near joints of the adjacent display sub-panels spliced together, in order to ensure that the display sub-panels do not leak light at data lines, a large-sized black matrix needs to be provided at the joints of the adjacent display sub-panels, that is, the black matrix needs to cover a joint gap between the joints and the data lines adjacent thereto at the same time, which results in that when the display panel displays an entire image by means of the display sub-panels, display defect such as a black stripe occurs at the joints due to an arrangement of the black matrix, thereby causing deterioration of the display effect.

SUMMARY

An embodiment of the present disclosure provides a display panel including a first display sub-panel, a second display sub-panel spliced with the first display sub-panel and a light-shielding layer, where a gap region exists between the first display sub-panel and the first display sub-panel, the light-shielding layer is at least located in the gap region, the first display sub-panel and the second display sub-panel each include a plurality of pixel units arranged in an array, and each pixel unit at least includes:
a substrate;
a data line located on the substrate;
a black matrix located on a side of the data line away from the substrate, where an orthographic projection of the data line on the substrate falls within an orthographic projection of the black matrix on the substrate, in at least one of the first display sub-panel and the second display sub-panel, the black matrix of the pixel unit closest to the gap region and the light-shielding layer are arranged with an interval therebetween, and the black matrix is located on a side away from the gap region in the pixel unit.

In some implementations, in at least one of the first display sub-panel and the second display sub-panel, a distance between the black matrix of the pixel unit closest to the gap region and a first edge of the pixel unit is smaller than a distance between the black matrix and a second edge of the pixel unit, the first edge being an edge of the pixel unit farthest from the gap region, and the second edge being an edge of the pixel unit closest to the gap region.

In some implementations, in each of the pixel units of the first display sub-panel and the second display sub-panel closest to the gap region, the distance between the black matrix and the first edge of the pixel unit is smaller than the distance between the black matrix and the second edge of the pixel unit.

In some implementations, in each of the pixel units in at least one of the first display sub-panel and the second display sub-panel, the distance between the black matrix and the first edge of the pixel unit is smaller than the distance between the black matrix and the second edge of the pixel unit.

In some implementations, in each of the pixel units of the first display sub-panel and the second display sub-panel, the distance between the black matrix and the first edge of the pixel unit is smaller than the distance between the black matrix and the second edge of the pixel unit.

In some implementations, the black matrix of the pixel unit closest to the gap region is provided in the same layer as the light-shielding layer.

In some implementations, the light-shielding layer extends from the gap region into the first display sub-panel and the first display sub-panel, respectively; each of the pixel units further includes a common electrode located on a side of the data line away from the substrate, where in the first display sub-panel and the second display sub-panel, an orthogonal projection of the common electrode of the pixel unit closest to the gap region on the substrate overlaps an orthogonal projection of the light-shielding layer on the substrate.

In some implementations, each of the pixel units further includes: a pixel electrode and an insulating layer located on a side, close to the substrate, of the common electrode, and the insulating layer is located between the pixel electrode and the common electrode.

In some implementations, each of the pixel units further includes a liquid crystal layer located between the black matrix and the common electrode.

In some implementations, the pixel unit is a multi-domain pixel unit or a single-domain pixel unit.

In some implementations, the common electrode in each pixel unit of the first display sub-panel and the common electrode in each pixel unit of the second display sub-panel are separated from each other.

In some implementations, each of the pixel units further includes a transistor coupled with the data line in the pixel unit in which the transistor is located, and the transistor is located on a side, close to the gap region, of the data line.

In some implementations, data lines in the pixel units in a same column are coupled with each other.

An embodiment of the present disclosure provides a method for manufacturing the display panel described above, the method including:
forming the data line on a surface of the substrate; and
forming the black matrix and the light-shielding layer on a side of the data line away from the substrate, where the light-shielding layer is at least located in the gap region, the orthographic projection of the data line on the substrate falls within the orthographic projection of the black matrix on the substrate, in at least one of the first display sub-panel and the second display sub-panel, the black matrix of the pixel unit closest to the gap region and the light-shielding layer are arranged with an interval therebetween, and the black matrix is located on the side away from the gap region in the pixel unit.

DRAWINGS

The accompanying drawings, which are included to provide a further understanding of the disclosure and are incorporated in and constitute a part of this specification, illustrate embodiments of the disclosure and together with the description serve to explain the disclosure, but do not constitute a limitation of the disclosure. In the drawings.

Figure 4:
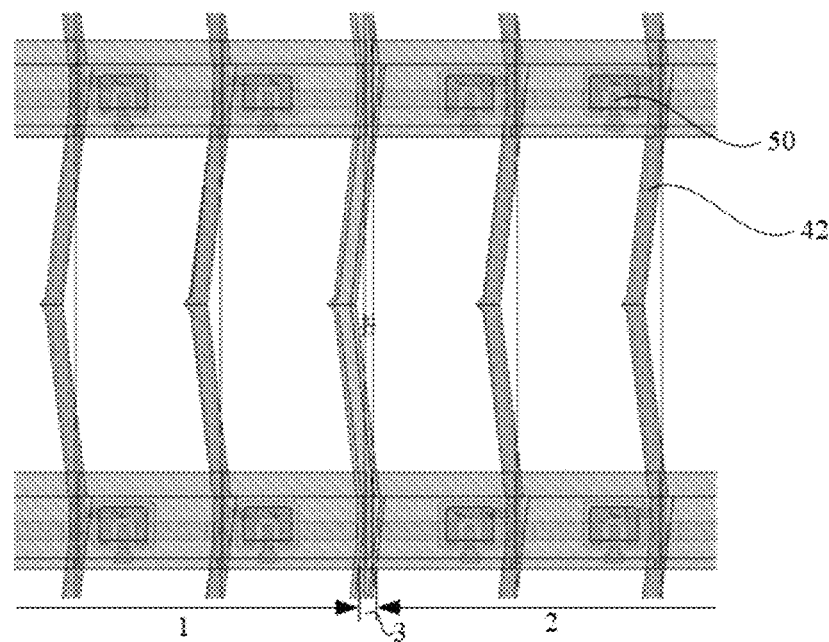
Figure 5:
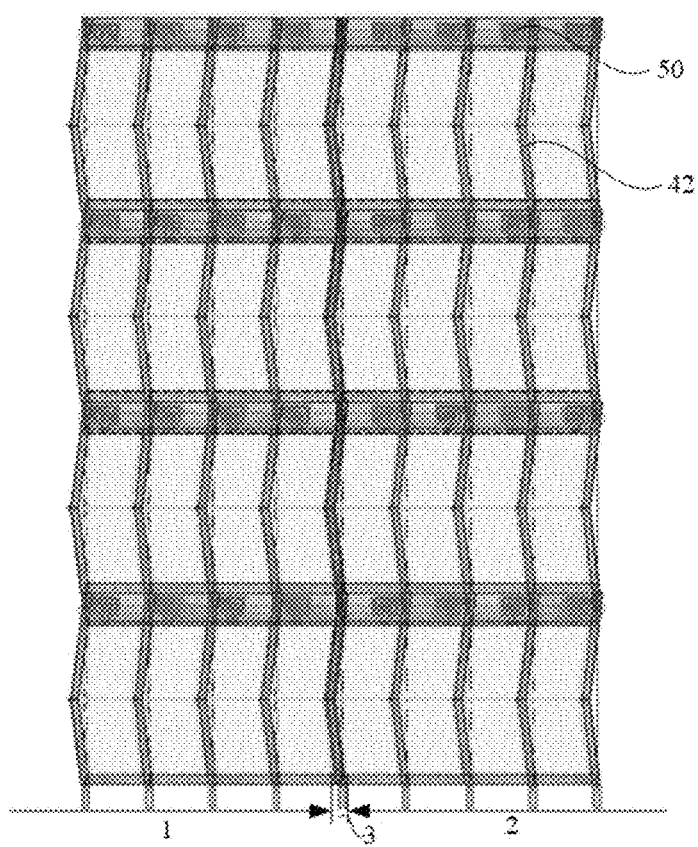
Figure 6:
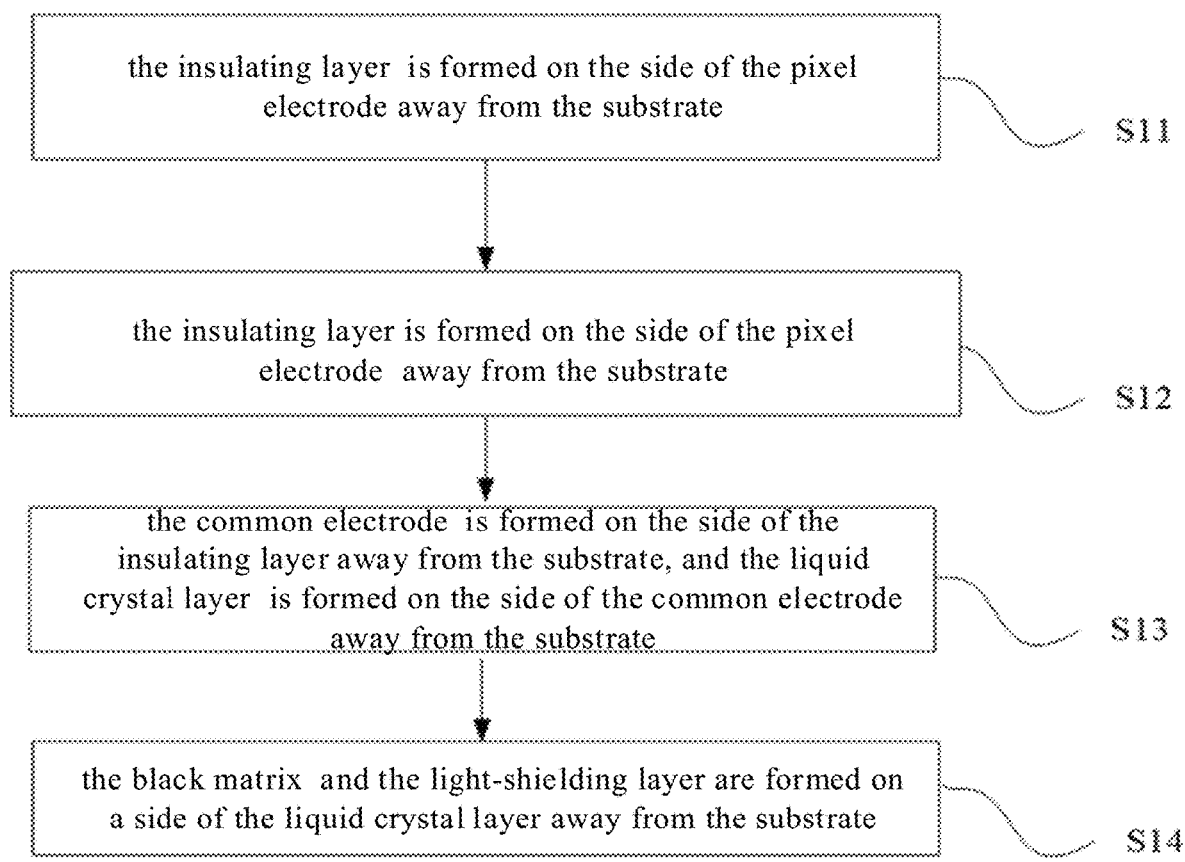

FIGS. 4 and 5 are schematic structural diagrams of a display panel in an embodiment of the present disclosure; and FIG. 6 is a schematic flow chart diagram illustrating a method for manufacturing a display panel according to an embodiment of the present disclosure, where reference numbers include: 1. first display sub-panel; 2. second display sub-panel; 3. gap region; 41. substrate; 42. data line; 43. black matrix; 44. first edge; 45. second edge; 46. common electrode; 47. pixel electrode; 48. light-shielding layer; 49. insulating layer; 50. transistor; 51. liquid crystal layer.

DETAILED DESCRIPTION

In order that those skilled in the art will better understand the technical solutions of the present disclosure, the following detailed description is given with reference to the accompanying drawings and the specific embodiments.

In the present disclosure, two structures being "provided in a same layer" means that the two structures are formed of a same layer of material, and thus are in the same layer in a stacked relationship, but does not mean that they are equidistant from the substrate, nor that other layer structures between them and the substrate are completely identical.

In the present disclosure, the "patterning process" refers to a step of forming a structure having a specific pattern, which may be a photolithography process including one or more steps of forming a material layer, coating a photoresist, exposing, developing, etching, stripping the photoresist, and the like; certainly, the "patterning process" may also be an imprinting process, an inkjet printing process, or other processes.

The present disclosure will be described in more detail below with reference to the accompanying drawings. Like elements are denoted by like reference numerals throughout the various figures. For purposes of clarity, the various features in the drawings are not drawn to scale. Moreover, certain well-known elements may not be shown in the figures.

Numerous specific details of the present disclosure, such as structures of the components, materials, dimensions, processing and techniques, are set forth in the following description in order to provide a more thorough understanding of the present disclosure. However, as will be understood by those skilled in the art, the present disclosure may be practiced without these specific details.

As shown in FIGS. 2 to 6, an embodiment of the present disclosure provides a display panel including: a first display sub-panel 1; a second display sub-panel 2 spiced with the first display sub-panel 1; and a light-shielding layer 48, where a gap region 3 exists between the first display sub-panel 1 and the second display sub-panel 1, the light-shielding layer 48 is at least located in the gap region 3, each of the first display sub-panel 1 and the second display sub-panel 2 includes a plurality of pixel units arranged in an array, each pixel unit at least includes a substrate 41, a data line 42, and a black matrix 43. The data line 42 is located on the substrate 41; the black matrix 43 is located on a side of the data line 42 away from the substrate 41, and an orthogonal projection of the data line 42 on the substrate 41 is located within an orthogonal projection of the black matrix 43 on the substrate 41, where, in at least one of the first display sub-panel 1 and the second display sub-panel 2, the black matrix 43 of the pixel unit closest to the gap region 3 and the light-shielding layer 48 are disposed with an interval therebetween, and the black matrix 43 is located on a side of the light-shielding layer 48 away from the gap region 3.

Figure 2:
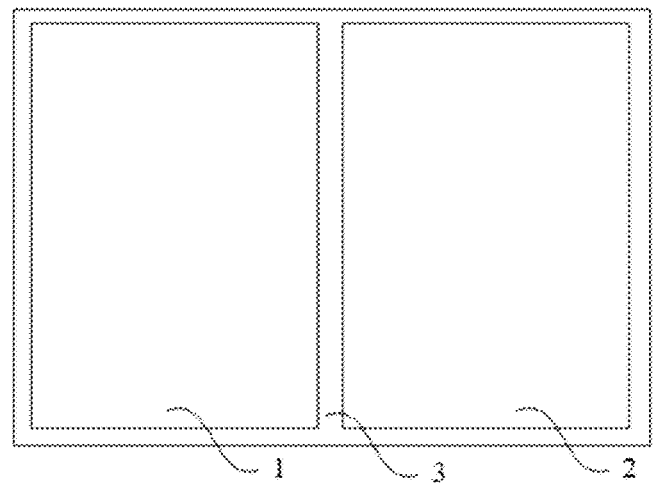
FIG. 2 is a schematic diagram of a display panel according to an embodiment of the present disclosure.

The display panel of the embodiment of the present disclosure is formed by splicing at least two display sub-panels, and the display sub-panels can respectively display different display pictures and can also display a whole picture together. As shown in FIG. 2, the following description will be made by taking two display sub-panels, i.e., the first display sub-panel 1 and the second display sub-panel 2, as an example. When the display panel is formed by splicing the first display sub-panel 1 and the second display sub-panel 2, the gap region 3 is between the first display sub-panel 1 and the second display sub-panel 2.

The light-shielding layer 48 is at least located in the gap region 3, that is, the light-shielding layer 48 at least covers the gap region 3 to reduce light leakage in the gap region 3.

Each of the first display sub-panel 1 and the second display sub-panel 2 includes a plurality of pixel units arranged in an array, and in each pixel unit, the black matrix 43 covers the data line 42, so that a light leakage phenomenon at a position corresponding to the data line 42 can be avoided. Here, the light-shielding layer 48 at least partially located in the gap region 3 and the black matrix 43 may be provided in a same layer.

In the first display sub-panel 1, the black matrix 43 of the pixel unit closest to the gap region 3 and the light-shielding layer 48 are disposed with an interval therebetween, and the black matrix 43 is disposed at a side of the light-shielding layer 48 away from the gap region 3, and/or, in the second display sub-panel 2, the black matrix 43 of the pixel unit closest to the gap region 3 and the light-shielding layer 48 are disposed with an interval therebetween, and the black matrix 43 is disposed at a side of the light-shielding layer 48 away from the gap region 3. The black matrix 43 and the light-shielding layer 48 being disposed with an interval therebetween means that there is an interval between the black matrix 43 and the light-shielding layer 48, and the interval may be a light-emitting region of the pixel unit; the black matrix 43 being disposed on the side of the light-shielding layer 48 away from the gap region 3 means that, with respect to the substrate 41, the black matrix 43 is at the same height as the light-shielding layer 48. Certainly, the black matrix 43 and the light-shielding layer 48 may be formed in the same layer through a single patterning process.

Figure 1:
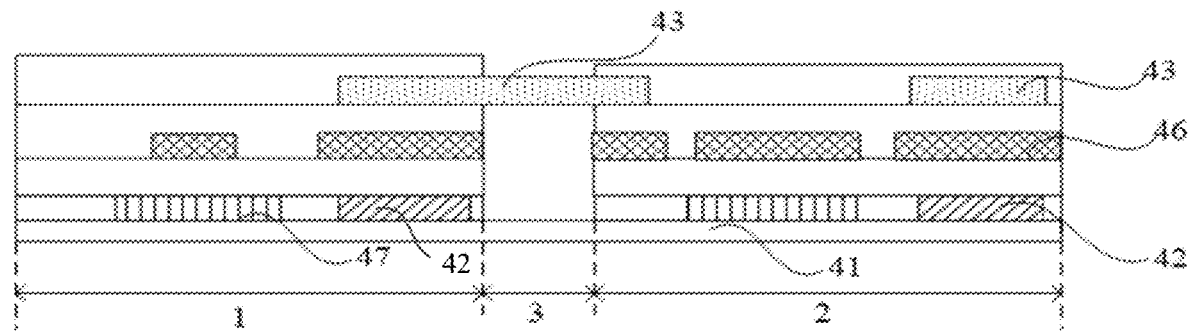
FIG. 1 is a schematic structural diagram of a part of a display panel in the related art.

It should be noted that, as shown in FIG. 1, in the spiced display panel in the related art, a data line 42 is disposed near the joints of the display sub-panels spliced together, and in order to ensure that the display sub-panels do not leak light at the data line 42, a black matrix 43 with a larger size is disposed at the joints of the spliced display sub-panels, that is, the black matrix 43 needs to cover both a joint gap (i.e., gap region) between the joints and the data line 42 adjacent thereto, which results in that when the display panel displays an entire image, display defect such as a black stripe occurs at the joints due to the arrangement of the black matrix 43, thereby causing deterioration of the display effect.

Figure 3:
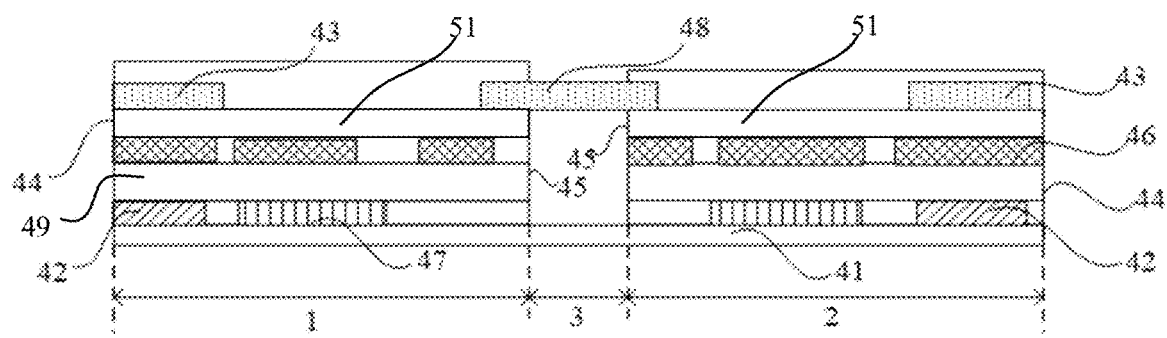
FIG. 3 is a schematic cross-sectional diagram of a display panel according to an embodiment of the present disclosure.

In the display panel of the embodiment of the present disclosure, as shown in FIG. 3, in at least one of the first display sub-panel 1 and the second display sub-panel 2, the black matrix 43 of the pixel unit closest to the gap region 3 and the light-shielding layer 48 are disposed with an interval therebetween (i.e., the originally larger light-shielding layer 48 is divided into two parts), so that the light-shielding layer 48 for shielding the gap region 3 has a smaller width across the gap region 3, and thus a light-shielding width at the gap region 3 is reduced, and further, when the display panel displays, the display defect due to the light-shielding layer 48 with larger width, for example, a black stripe, is avoided, so as to ensure the display effect of the display panel, and thus, a seamless spiced display panel is formed.

In some implementations, in at least one of the first display sub-panel 1 and the second display sub-panel 2, a distance between the black matrix 43 of the pixel unit closest to the gap region 3 and a first edge 44 of the pixel unit is smaller than a distance between the black matrix 43 and a second edge 45 of the pixel unit, the first edge 44 is an edge of the pixel unit farthest from the gap region 3, and the second edge 45 is an edge of the pixel unit closest to the gap region 3. It should be understood that the distance between the black matrix 43 and the first edge 44 of the pixel unit may refer to a distance between an edge of the black matrix 43 close to the first edge 44 and the first edge 44, and likewise, the distance between the black matrix 43 and the second edge 45 of the pixel unit may refer to a distance between an edge of the black matrix 43 close to the second edge 45 and the second edge 45.

That is, in at least one of the first display sub-panel 1 and the second display sub-panel 2, the black matrix 43 in the pixel unit closest to the gap region 3 is closer to the first edge 44 than the second edge 45, so that the interval between the light-shielding layer 48 and the black matrix 43 is relative large, and the display unit can be disposed in a region between the light-shielding layer 48 and the black matrix 43, that is, the region between the light-shielding layer 48 and the black matrix 43 is a display region. In such case, the data line 42 corresponding to the black matrix 43 is also closer to the first edge 44 than the second edge 45.

Thus, when manufacturing the pixel units, the data line 42 of the corresponding pixel unit may be firstly formed at a position close to the first edge 44 and away from the second edge 45, and secondly, the black matrix 43 for shielding the data line 42 may also be arranged at a position close to the first edge 44 and away from the second edge 45; the display unit is arranged between the light-shielding layer 48 and the black matrix 43, and the above structure of the pixel unit can eliminate the display defect at the gap region 3 without affecting the display performance and the size of the pixel unit, thereby ensuring the display performance of the display panel.

In some implementations, in the pixel units, closest to the gap region 3, of the first display sub-panel 1 and second display sub-panel 2, the distance between the black matrix 43 and the first edge 44 is smaller than the distance between the black matrix 43 and the second edge 45.

That is, in each of the pixel units in two columns located closest to two sides of the gap region 3, the black matrix 43 and the data line 42 are close to the first edge 44 and away from the second edge 45, that is, the black matrix 43 and the data line 42 are closer to the edge of the pixel unit away from the gap region 3.

Since a column of pixel units in each display sub-panel corresponds to a same data line 42, when positions of data lines 42 of all the pixel units in a whole column closest to the gap region 3 are relatively consistent, the light leakage phenomenon at the gap region 3 can be further reduced, and the manufacturing process of the display panel can be simple.

In addition, since the data line 42 in each of the pixel units in two columns closest to both sides of the gap region 3 is away from the edge of the pixel unit close to the gap region 3, no data signal affecting the electric field around the gap region exists at the position close to the gap region 3, so that the electric field in the vicinity of the gap region 3 is stabilized. Meanwhile, since the black matrix 43 covering the data line 42 does not need to be disposed in the vicinity of the gap region 3, the width of the light-shielding layer 48 for shielding the gap region 3 may be set to be small, and in some implementations, the width of the light-shielding layer 48 is the same as the width of the black matrix 43, thereby forming a seamless spiced display panel.

It should be noted that the data lines 42 of the pixel units in a same column may be connected to each other, i.e., each column of pixel units shares a same data line 42.

In some implementations, in at least one of the first display sub-panel 1 and the second display sub-panel 2, the distance from the first edge 44 to the black matrix 43 of each pixel unit is smaller than the distance from the second edge 45 to the black matrix 43.

That is, arrangements of the data lines 42 of all the pixel units in the first display sub-panel 1 are the same, and/or arrangements of the data lines 42 of all the pixel units in the second display sub-panel 2 are the same.

In a case where the arrangements of the data lines 42 of all the pixel units in the first display sub-panel 1 are the same, the method for manufacturing the first display sub-panel 1 can be made simpler; or, in a case where the arrangements of the data lines 42 of all the pixel units in the second display sub-panel 2 are the same, the method for manufacturing the second display sub-panel 2 can be simpler, so as to simplify the manufacturing method of the display panel and reduce the manufacturing cost.

Further, in some implementations, in each of all pixel units of the first display sub-panel 1 and the second display sub-panel 2, the distance between the black matrix 43 and the first edge 44 is smaller than the distance between the black matrix 43 and the second edge 45.

That is to say, the arrangements of the data lines 42 of all the pixel units in the display panel are the same, which can further simplify the manufacturing method of the display panel and reduce the manufacturing cost.

In some implementations, the light-shielding layer 48 extends from the gap region 3 into the first display sub-panel 1 and the second display sub-panel 2 respectively; each pixel unit further includes a common electrode 46, which is located between the substrate 41 and the light-shielding layer 48, that is, on the substrate 41 and on a side of the light-shielding layer 48 close to the substrate 41, in each of the first display sub-panel 1 and the second display sub-panel 2, an orthographic projection of the common electrode 46 of each pixel unit closest to the gap region 3 on the substrate 41 overlaps with an orthographic projection of the light-shielding layer 48 on the substrate 41.

That is, at least a portion of the light-shielding layer 48 extends beyond the second edge 45 of the pixel unit adjacent thereto and overlaps a portion of the common electrode 46 in the pixel unit corresponding thereto.

The overlapping portion of the light-shielding layer 48 and the common electrode 46 can further prevent the light emitted by the display unit from leaking from the gap region 3, so as to further ensure the display performance of the display panel, and simultaneously can shield the coupling electric field generated by the common electrode 46, so that the influence of the coupling electric field generated by the common electrode 46 on the circuit structures in the pixel unit can be reduced, and normal display of the pixel unit can be ensured.

In some implementations, each pixel unit further includes: a pixel electrode 47 and an insulating layer 49 on the substrate 41, the pixel electrode 47 being located between the common electrode 46 and the substrate 41, and the insulating layer 49 being located between the pixel electrode 47 and the common electrode 46.

That is, the insulating layer 49 insulates the pixel electrode 47 from the common electrode 46, so that a driving signal can be generated by the pixel electrode 47 and the common electrode 46 to cause the pixel unit to complete a display process.

It should be noted that the common electrode 46 of the first display sub-panel 1 and the common electrode 46 of the second display sub-panel 2 may not be electrically connected to each other (i.e., they may be separated from each other), so that the first display sub-panel 1 and the second display sub-panel 2 may be controlled separately.

Specifically, each pixel unit further includes a liquid crystal layer 51 located between the black matrix 43 and the common electrode 46.

That is, the two display sub-panels in the embodiment of the present disclosure may be liquid crystal display panels, and the pixel electrode 47 and the common electrode 46 may generate an electric field for driving liquid crystal molecules in the liquid crystal layer 51 to deflect, thereby implementing display of the pixel unit.

It should be noted that the two display sub-panels in the embodiment of the present disclosure may also be organic light emitting diode display panels, or display panels of other usable types, which may be determined according to the actual application of the display panel.

In some implementations, each pixel unit of the first display sub-panel 1 and the second display sub-panel 2 may be a multi-domain pixel unit, for example, a 2-domain pixel unit, as shown in FIG. 4 or FIG. 5. Certainly, each pixel unit of the first display sub-panel 1 and the second display sub-panel 2 may also be a single-domain pixel unit.

In some implementations, each pixel unit further includes a transistor 50, where the transistor 50 is coupled with the data line 42 in the each pixel unit, and the transistor 50 is positioned on a side of the data line 42 close to the gap region 3.

As shown in FIGS. 4 and 5, data lines 42 and transistors 50 in the first display sub-panel 1 and the second display sub-panel 2 are arranged in mirror symmetry with respect to the gap region 3. When the data line 42 in the pixel unit is close to the first edge 44 of the pixel unit and away from the second edge 45 of the pixel unit, the transistor 50 is more easily disposed in a space on the side of the data line 42 close to the gap region 3. Such arrangement of the transistors 50 ensures performance of other structures in each pixel unit while adapting the arrangement of the data lines 42.

Specifically, as shown in FIG. 4, the transistor 50 includes at least a source and a drain, one of the source and the drain is a U-shaped structure, and the other is an I-shaped structure, at least a portion of the I-shaped structure is located in a concave region of the U-shaped structure, and is spaced apart from the U-shaped structure.

Specifically, the display panel can be any product or component with a display function, such as electronic paper, a mobile phone, a tablet computer, a television, a display, a notebook computer, a digital photo frame, a navigator and the like.

As shown in FIGS. 2 to 6, an embodiment of the present disclosure provides a method for manufacturing a display panel, where the display panel may be the display panel in the foregoing embodiment, and the display panel includes: the first display sub-panel 1, the second display sub-panel 2 spliced with the first display sub-panel 1; and the light-shielding layer 48, where the gap region 3 exists between the first display sub-panel 1 and the first display sub-panel 1, and the method includes following steps S11 to S14.

In step S11, the data line 42 and the pixel electrode 47 are formed on a surface of the substrate 41.

The data line 42 and the pixel electrode 47 in each pixel unit may be simultaneously formed by using a single patterning process. In some implementations, the distance between the data line 42 of each pixel unit and the first edge 44 of the pixel unit is smaller than the distance between the data line 42 and the second edge 45 of the pixel unit, so that a certain interval exists between the data line 42 of the pixel unit closest to the gap region 3 and the gap region 3.

It should be noted that the pixel electrode 47 in the pixel unit may be disposed in the same layer as the data line 42, that is, the data line 42 and the pixel electrode 47 may be formed simultaneously by using a single patterning process.

In step S12, the insulating layer 49 is formed on the side of the pixel electrode 47 away from the substrate 41.

In step S13, the common electrode 46 is formed on the side of the insulating layer away from the substrate 41, and the liquid crystal layer 51 is formed on the side of the common electrode 46 away from the substrate 41.

The pixel electrode 47 and the common electrode 46 can generate an electric field for driving liquid crystal molecules in the liquid crystal layer 51 to deflect, thereby realizing display of the pixel unit.

In step S14, the black matrix 43 and the light-shielding layer 48 are formed on a side of the liquid crystal layer away from the substrate 41, the light-shielding layer 48 being at least located in the gap region 3, the orthogonal projection of the data line 42 on the substrate 41 being located within the orthogonal projection of the black matrix 43 on the substrate 41, where, in at least one of the first display sub-panel 1 and the second display sub-panel 2, the black matrix 43 of each pixel unit closest to the gap region 3 and the light-shielding layer 48 are disposed with an interval therebetween, and the black matrix 43 is located on a side of the light-shielding layer 48 away from the gap region 3, that is, the black matrix 43 is close to the first edge 44 of the pixel unit in which it is located.

The black matrix 43 and the light-shielding layer 48 being disposed with an interval therebetween means that there is an interval between the black matrix 43 and the light-shielding layer 48, and the interval may be a light-emitting region of the pixel unit; meanwhile, the black matrix 43 and the light-shielding layer 48 are at a same height with respect to the substrate 41.

In the method for manufacturing the display panel in the embodiment of the present disclosure, in at least one of the first display sub-panel 1 and the second display sub-panel 2, the black matrix 43 and the light-shielding layer 48 of the pixel unit closest to the gap region 3 are disposed with an interval therebetween (i.e., the originally larger light-shielding layer 48 is divided into two parts including the current black matrix 43 and the light-shielding layer 48), so that the width of the light-shielding layer 48 for shielding the gap region 3 across the gap region 3 is reduced, thereby reducing the light-shielding width at the gap region 3, and further avoiding the display defect due to the larger light-shielding layer 48 in the display process of the display panel, such as avoiding the occurrence of the black stripe, so as to ensure the display effect of the display panel.

In addition, in the method for manufacturing the display panel, no new process is required to be added, and only the positions of the data lines 42 and the black matrixes 43 are changed (for example, the mask plates for forming the data lines 42 and the black matrixes 43 are replaced), and the aperture ratio of the display panel is not influenced.

It should be noted that, herein, relational terms such as first and second, and the like are only used to distinguish one entity or action from another entity or action without necessarily requiring or implying any actual such relationship or order between such entities or actions. Also, the terms "comprise", "include" or any other variation thereof, are intended to cover a non-exclusive inclusion, such that a process, method, article, or apparatus that includes a list of elements does not include only these elements but may include other elements not expressly listed or inherent to such process, method, article, or apparatus. Without further limitation, an element defined by the phrase "including an . . ." does not exclude the presence of other identical elements in the process, method, article, or apparatus that includes the element.

In accordance with the disclosed embodiments, as described above, these embodiments are not intended to be exhaustive or to limit the application to the precise embodiments disclosed. Obviously, many modifications and variations are possible in light of the above teaching. The embodiments were chosen and described in order to best explain the principles of the disclosure and the practical application, to thereby enable others skilled in the art to best utilize the disclosure and various embodiments with various modifications as are suited to the particular use contemplated. The present disclosure is to be limited only by the claims and their full scope and equivalents.

The invention claimed is:

1. A display panel, comprising a first display sub-panel, a second display sub-panel spliced with the first display sub-panel and a light-shielding layer, wherein a gap region exists between the first display sub-panel and the second display sub-panel, the light-shielding layer is at least located in the gap region,
the first display sub-panel and the second display sub-panel each comprise a plurality of pixel units arranged in an array, and each pixel unit at least comprises:
a substrate;
a data line located on the substrate;
a black matrix located on a side of the data line away from the substrate, wherein an orthographic projection of the data line on the substrate falls within an orthographic projection of the black matrix on the substrate, in at least one of the first display sub-panel and the second display sub-panel, the black matrix of the pixel unit closest to the gap region and the light-shielding layer are arranged with an interval therebetween, the black matrix is located on a side away from the gap region in the pixel unit, and wherein
each of the pixel units further comprises a transistor coupled with the data line in the pixel unit in which the transistor is located, and the transistor is located on a side, close to the gap region, of the data line,
wherein data lines and transistors in the first display sub-panel and the second display sub-panel are arranged in mirror symmetry with respect to the gap region.

2. The display panel according to claim 1, wherein, in at least one of the first display sub-panel and the second display sub-panel, a distance between the black matrix of the pixel unit closest to the gap region and a first edge of the pixel unit is smaller than a distance between the black matrix and a second edge of the pixel unit, the first edge being an edge of the pixel unit farthest from the gap region, and the second edge being an edge of the pixel unit closest to the gap region.

3. The display panel according to claim 2, wherein in each of the pixel units of the first display sub-panel and the second display sub-panel closest to the gap region, the distance between the black matrix and the first edge of the pixel unit is smaller than the distance between the black matrix and the second edge of the pixel unit.

4. The display panel according to claim 2, wherein, in each of the pixel units in at least one of the first display sub-panel and the second display sub-panel, the distance between the black matrix and the first edge of the pixel unit is smaller than the distance between the black matrix and the second edge of the pixel unit.

5. The display panel according to claim 2, wherein in each of the pixel units of the first display sub-panel and the second display sub-panel, the distance between the black matrix and the first edge of the pixel unit is smaller than the distance between the black matrix and the second edge of the pixel unit.

6. The display panel according to claim 1, wherein the black matrix of the pixel unit closest to the gap region is provided in the same layer as the light-shielding layer.

7. The display panel according to claim 1, wherein the light-shielding layer extends from the gap region into the first display sub-panel and the second display sub-panel, respectively;
each of the pixel units further comprises a common electrode located on a side of the data line away from the substrate, wherein in each of the first display sub-panel and the second display sub-panel, an orthogonal projection of the common electrode of the pixel unit closest to the gap region on the substrate overlaps the orthogonal projection of the light-shielding layer on the substrate.

8. The display panel according to claim 7, wherein each of the pixel units further comprises a pixel electrode and an insulating layer located on a side, close to the substrate, of the common electrode, and the insulating layer is located between the pixel electrode and the common electrode.

9. The display panel according to claim 7, wherein the common electrode in each pixel unit of the first display sub-panel and the common electrode in each pixel unit of the second display sub-panel are separated from each other.

10. A display panel, comprising a first display sub-panel, a second display sub-panel spliced with the first display sub-panel and a light-shielding layer, wherein a gap region exists between the first display sub-panel and the second display sub-panel, the light-shielding layer is at least located in the gap region,
the first display sub-panel and the second display sub-panel each comprise a plurality of pixel units arranged in an array, and each pixel unit at least comprises:
a substrate;
a data line located on the substrate;

a black matrix located on a side of the data line away from the substrate, wherein an orthographic projection of the data line on the substrate falls within an orthographic projection of the black matrix on the substrate, in at least one of the first display sub-panel and the second display sub-panel, the black matrix of the pixel unit closest to the gap region and the light-shielding layer are arranged with an interval therebetween, the black matrix is located on a side away from the gap region in the pixel unit, and wherein an orthographic projection of the light-shielding layer on the substrate is not overlapped with the orthographic projection of the data line on the substrate, wherein data lines and transistors in the first display sub-panel and the second display sub-panel are arranged in mirror symmetry with respect to the gap region.

11. The display panel according to claim 10, wherein, in at least one of the first display sub-panel and the second display sub-panel, a distance between the black matrix of the pixel unit closest to the gap region and a first edge of the pixel unit is smaller than a distance between the black matrix and a second edge of the pixel unit, the first edge being an edge of the pixel unit farthest from the gap region, and the second edge being an edge of the pixel unit closest to the gap region.

12. The display panel according to claim 11, wherein in each of the pixel units of the first display sub-panel and the second display sub-panel closest to the gap region, the distance between the black matrix and the first edge of the pixel unit is smaller than the distance between the black matrix and the second edge of the pixel unit.

13. The display panel according to claim 11, wherein, in each of the pixel units in at least one of the first display sub-panel and the second display sub-panel, the distance between the black matrix and the first edge of the pixel unit is smaller than the distance between the black matrix and the second edge of the pixel unit.

14. The display panel according to claim 11, wherein in each of the pixel units of the first display sub-panel and the second display sub-panel, the distance between the black matrix and the first edge of the pixel unit is smaller than the distance between the black matrix and the second edge of the pixel unit.

15. The display panel according to claim 10, wherein the black matrix of the pixel unit closest to the gap region is provided in the same layer as the light-shielding layer.

16. The display panel according to claim 10, wherein the light-shielding layer extends from the gap region into the first display sub-panel and the first second display sub-panel, respectively;

each of the pixel units further comprises a common electrode located on a side of the data line away from the substrate, wherein in each of the first display sub-panel and the second display sub-panel, an orthogonal projection of the common electrode of the pixel unit closest to the gap region on the substrate overlaps the orthogonal projection of the light-shielding layer on the substrate.

17. The display panel according to claim 16, wherein each of the pixel units further comprises a pixel electrode and an insulating layer located on a side, close to the substrate, of the common electrode, and the insulating layer is located between the pixel electrode and the common electrode.

18. The display panel according to claim 16, wherein the common electrode in each pixel unit of the first display sub-panel and the common electrode in each pixel unit of the second display sub-panel are separated from each other.

\* \* \* \* \*